United States Patent [19]

Agoston et al.

[11] Patent Number: 4,680,780
[45] Date of Patent: Jul. 14, 1987

[54] CLOCK RECOVERY DIGITAL PHASE-LOCKED LOOP

[75] Inventors: Agoston Agoston, Beaverton; Robert G. Sparkes, Portland, both of Oreg.

[73] Assignee: Tektronix, Inc., Beaverton, Oreg.

[21] Appl. No.: 858,425

[22] Filed: May 1, 1986

[51] Int. Cl.⁴ .......................... H03D 3/24; H03D 3/18
[52] U.S. Cl. ..................................... 375/120; 375/81; 375/108; 331/1 A; 328/140; 328/155; 329/2; 329/50; 329/122; 329/123
[58] Field of Search ............. 375/108, 119, 120, 81; 331/1 A; 328/139, 140, 141, 155; 329/122, 123, 2, 50

[56] References Cited

U.S. PATENT DOCUMENTS

| | | |
|---|---|---|
| 4,019,153 | 4/1977 | Cox, Jr. et al. ............. 375/120 |
| 4,119,796 | 10/1978 | Jones ......................... 375/111 |
| 4,280,099 | 7/1981 | Rattlingourd ............... 375/119 |
| 4,330,863 | 5/1982 | Wright ........................ 375/81 |
| 4,374,438 | 2/1983 | Crowley ..................... 375/120 |

OTHER PUBLICATIONS

"Digital Phase-Locked Loop Finds Clock Signal in Bit Stream"; by John Snyder, Electronics, vol. 52, No. 18, Aug. 30, 1979, pp. 126-130.

*Primary Examiner*—James J. Groody
*Assistant Examiner*—Michael D. Parker
*Attorney, Agent, or Firm*—William O. Geny; Robert S. Hulse

[57] ABSTRACT

A digital phase-locked loop circuit for recovering an external clock signal from an input serial data stream includes an up/down counter responsive to both the serial data stream and to the clock pulse output of a variable divider driven by an external clock. The up/down counter counts in a direction which depends upon whether the input data stream leads or lags the variable divider's clock pulse output. The output of the up/down counter drives an n-bit memory and a comparator such that the n-bit memory stores the n most significant bits of the up/down counter for a predetermined period of time and then provides them to the comparator for comparison with the present value of the up/down counter. A binary code is provided to the variable divider to determine its divisor depending upon whether the memory count is greater than, equal to, or less than the present count of the up/down counter. This enables an external clock to be synchronized to the input data stream while removing random noise.

9 Claims, 1 Drawing Figure

CLOCK RECOVERY DIGITAL PHASE-LOCKED LOOP

BACKGROUND OF THE INVENTION

Digital phase-locked loop circuits have been in use as FM demodulators and may be used in any application in which it is desired to synchronize an input data stream with an external clock. Examples of such circuits are shown in "Analysis and Synthesis of a Digital Phase Locked Loop for FM Demodulation," Pasternack and Whalin, *The Bell System Technical Journal*, December 1968, pages 2207–2237 and "Jitter Reduction of a Digital Phase Locked Loop," Yamashita el al., *Proceedings of the IEEE*, November 1976, pages 1640, 1641. A problem with digital phase-locked loops is the presence of noise in the input data stream which may be interpreted as data. If registers or counters are used in the phase detector, the noise will be interpreted as data which is out of phase with the output of a voltage controlled oscillator. It would be desirable to filter this noise from the input data stream while at the same time locking an external clock to the input data stream.

SUMMARY OF THE INVENTION

The present invention provides a circuit which is a digital phase-locked loop for recovering clock pulses from a pseudorandom serial data stream while at the same time providing noise filtering capability. The invention includes a variable clock which produces a series of clock pulses whose frequency is a function of a coded input signal. An up/down counter responsive to an input data stream and to the clock pulses from the variable clock, counts in one direction when the phase of the data stream leads the clock pulses, and in a second direction when the phase of the data stream lags the clock pulses. A comparator compares a present count of the up/down counter with a previous count and provides a coded signal to the variable clock to increase or decrease the frequency depending upon whether the input data stream leads or lags the output of the variable clock.

The comparator utilizes an n-bit memory responsive to the output of the up/down counter for storing the two most significant bits of the counter. The output of the up/down counter is also applied directly to the comparator, and this output is compared with the contents of the n-bit memory. The contents of the memory are delayed for a predetermined period of time before they are gated into the comparator. The delayed output of the n-bit memory is controlled by an m-bit divider which is driven by the variable clock output so that the present most significant bits of the counter are compared with a previous value of the counter. This comparison is used to determine the frequency of the variable clock output.

The digital comparator provides control signals to a variable divider circuit which is driven by an external clock generator. The coded output of the digital comparator chooses one of three integral values to be used as the divisor in the variable divider depending upon whether the counter is counting "up" or "down" from its previous value. An integer x is the divisor when the input data stream and the variable clock pulses are in phase (i.e. previous count and present count are the same). The divisor is x+1 when the variable clock pulses lead the input serial data stream (the up/down counter is counting down from the previous count), and is x−1 when the input serial data stream leads the clock pulses (the up/down counter is counting up from the previous count).

Since the memory stores the two most significant bits of the up/down counter for a predetermined period of time, the loop is unaffected by random noise which might be interpreted as data. Random noise spikes are ignored because the coded signal at the digital comparator output is a function of the change in only the two most significant bits of the up/down counter. It therefore requires a low frequency condition such as a phase difference between the input data stream and the variable clock pulses which persists for a number of clock cycles to produce a coded signal which changes the d::visor of the variable divider.

It is a principal object of this invention to provide a clock recovery digital phase-locked loop circuit for locking an incoming serial input data stream to an external clock, thereby recovering clock pulses from the data stream.

Yet a further object of this invention is to provide a clock recovery ditial phase-locked loop circuit which filters out the effects of random noise in the serial input data stream.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
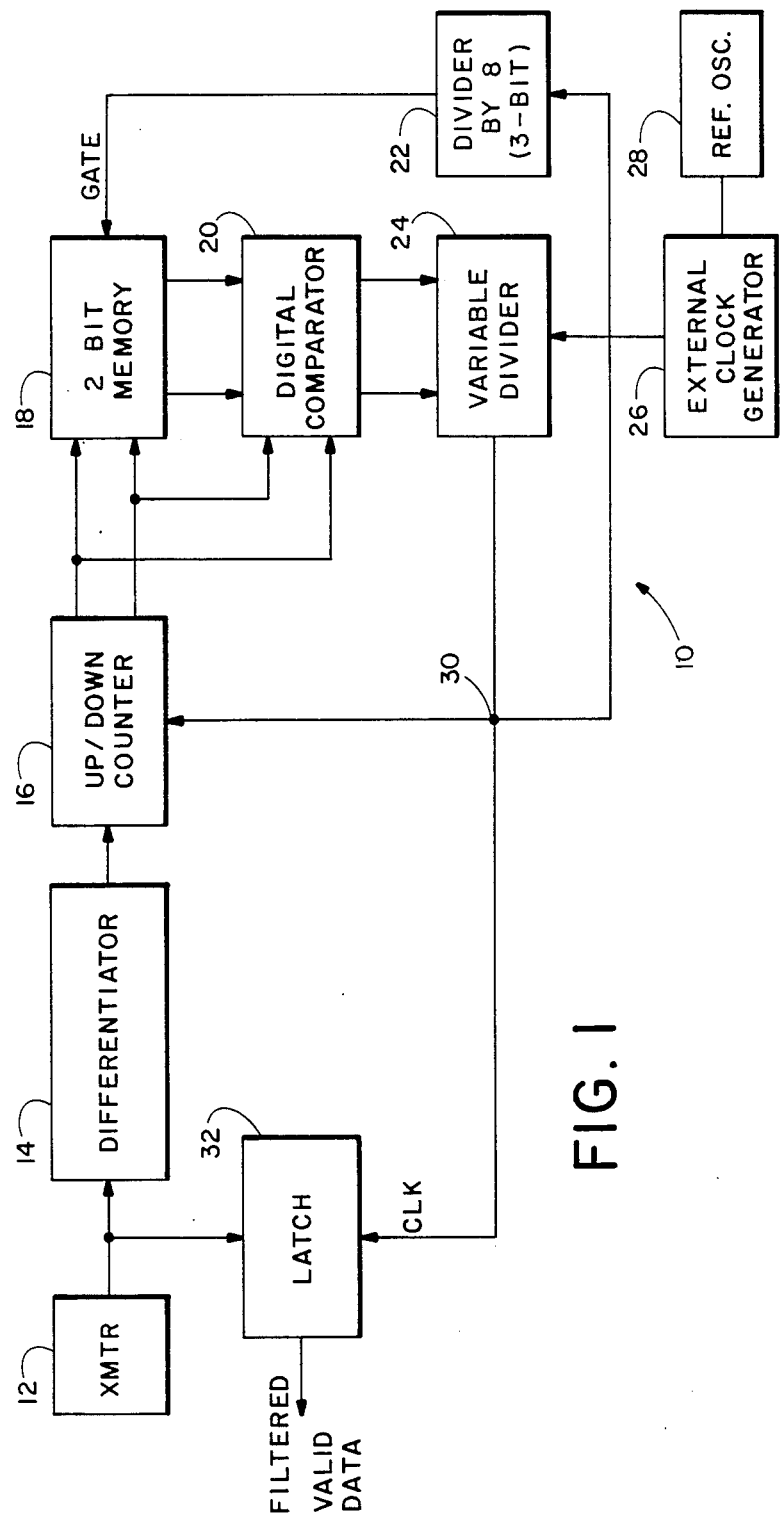
FIG. 1 is a block schematic diagram of a digital phase-locked loop constructed according to the present invention.

A digital phase-locked loop circuit 10 is responsive to a transmitter 12 which transmits a stream of serial data. The data is applied to a differentiator 14 which produces spikes at the leading and trailing edges of each of the data pulses in the serial data stream. These pulses are applied to an up/down counter 16. The up/down counter 16, which may be a 4-bit counter, includes an output for its two most significant bits which are connected to a 2-bit memory 18. Output lines containing the two most significant bits of the up/down counter 16 are also connected to a digital comparator 20. The 2-bit memory also includes a pair of output lines which apply the two most significant bits of the up/down counter 16 to the digital comparator 20 after a predetermined period of time determined by divider 22. The divider 22 is a 3-bit divider driven by variable divider 24 and provides a gating control to 2-bit memory 18 every eight clock cycles of the output of divider 24. The variable divider 24 is driven by an external clock generator 26 which is, in turn, driven by a reference oscillator 28. The output of the variable divider 24 is applied to a node 30 which includes outputs to divider 22, up/down counter 16 and a latching circuit 32. The input data line is also connected to the latch circuit 32.

In actual operation, a serial data stream is transmitted by transmitter 12 where it is provided to latch circuit 32 and also to differentiator 14. Differentiator 14 converts the leading and trailing edges of each pulse in the serial data stream to spikes which are provided to up/down counter 16. The pulse width of the data pulses is larger than the width of the variable clock pulses, and the variable clock pulses are in the form of a series of rectangular pulses of uniform width. Thus, the clock input line to the up/down counter 16 from node 30 is always either high or low, and for equal periods of time. The up/down counter 16 will count up when a data spike occurs when the clock input line is high, and will count down when the input line is low. Therefore, when the serial data stream and the external clock 26 are in phase, the counter will alternately count up and down on successive data spikes. When the phase between the data input and the external clock shifts, however, the up/down counter will count either up or down depending upon whether the data leads or lags the clock pulses.

As the up/down counter 16 begins to count, the two most significant bits of the counter will remain unchanged until the count reaches 4. The two most significant bits are stored in the 2-bit memory 18 but are held there by divider 22 for eight cycles of the divided external clock 26 from divider 24. At the same time, however, the same two most significant bits are provided to digital comparator 20. Digital comparator 20 provides an output binary code which instructs variable divider 24 to chose one of three possible divisors. In the preferred embodiment, variable divider 24 is nominally a divide-by-24 divider, but depending upon whether the input data stream leads or lags the divided clock pulses, variable divider 24 may divide by 23 or divide by 25, respectively. The code that is provided to variable divider 24 is a function of whether the delayed values of two most significant bits of up/down counter 16 which are held in 2-bit memory 18 are greater than, equal to, or less than the present value of the two most significant bits of counter 16.

Since the two most significant bits of up/down counter 16 change only every fourth count, the system will be unaffected by most random noise. Moreover, since the present state of the up/down counter 16 is compared to a previous state which is held in 2-bit memory 18 for eight clock cycles, only low frequency phase imbalances are detected. Holding the previous state of the up/down counter 16 in 2-bit memory 18 for eight clock cycles filters out small variations in the direction in which the up/down counter 16 is counting. Since changes in phase between the clock pulses from variable divider 24 and the input data stream tend to be low frequency phenomena, these are properly interpreted in the digital comparator 20 as calling for a change in the frequency of variable divider 24, while short-term phenomena such as transient noise are ignored.

It should be appreciated that the values chosen for the up/down counter 16, the 2-bit memory 18 and the divider 22 are arbitrary and could be adjusted to meet the needs of the user. In the preferred embodiment, up/down counter 16 is a 4-bit counter, 2-bit memory 18 is a 2-bit memory, and divider 22 is a divide-by-8 clock pulse divider. However, the up/down counter 16 could be as small or as large as desired; the memory 18 could be an n-bit memory, and divider 22 could be an m-bit divider. Moreover, the variable divider 24 could be adjusted to provide for division by integers other than those chosen.

The result of use of the circuit 10 is that the clock pulses from variable divider 24 may be utilized to latch the input data stream in latch circuit 32. The data will therefore be valid data which has been filtered and which is synchronized with external clock generator 26. Thus, any clock pulses inherent in a pseudorandom serial data stream may be recovered because the data in latch circuit 32 is synchronized with a known clock.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A digital phase-locked loop circuit for synchronizing a clock to a serial data stream comprising;
   (a) variable clock means for producing a series of clock pulses whose frequency is a function of a coded input signal;
   (b) up/down counter means responsive to said serial data stream and to said clock pulses for counting in a first direction when the phase of said data stream leads said clock pulses, and for counting in a second direction when the phase of said data stream lags said clock pulses; and
   (c) comparator means for comparing a present count of said up/down counter means with a previous count of said up/down counter means, and for providing said coded input signal to said variable clock means to increase the frequency of said variable clock means when the phase of said serial data stream leads said clock pulses, and to decrease the frequency of said variable clock means when the phase of said serial data stream lags said clock pulses.

2. The digital phase-locked loop of claim 1, further including means for storing the n most significant bits of said up/down counter means for a predetermined period of time before providing said n most significant bits to said comparator means.

3. The digital phase-locked loop of claim 2 wherein said means for storing said n most significant bits includes an n-bit memory and an m-bit divider responsive to said series of clock pulses for controlling said predetermined period of time before the contents of said n-bit memory are provided to said comparator means.

4. The digital phase-locked loop of claim 1 wherein said variable clock means comprises an external clock coupled to a variable divider.

5. The digital phase-locked loop of claim 4 wherein said coded input signal comprises a binary code which determines the divisor for said variable divider.

6. A digital phase-locked loop circuit for synchronizing a clock to a serial data stream comprising:
   (a) variable clock means for producing a series of clock pulses whose frequency is a function of a coded input signal;
   (b) up/down counter means responsive to said serial data stream and to said clock pulses for counting in a first direction when the phase of said data stream leads said clock pulses, and for counting in a second direction when the phase of said data stream lags said clock pulses; and
   (c) filter means responsive to an output of said up/down counter means for providing said coded input signal to said variable clock means to vary the frequency of said variable clock means, wherein said coded input signal changes only after a predetermined number of cycles of said external variable clock means, such that noise in said data stream is filtered from said serial data stream.

7. The digital phase-locked loop of claim 6 wherein said filter means comprises a comparator for comparing an instantaneous output of said up/down counter means with a delayed output of said up/down counter means.

8. The digital phase-locked loop of claim 7 wherein said delayed output of said up/down counter means is produced by an n-bit memory responsive to an output of said up/down counter means, and to a gating means for gating the contents of said n-bit memory into said comparator after a predetermined period of time.

9. The digital phase-locked loop of claim 8 wherein said gating means comprises an m-bit divider responsive to said variable clock means.

* * * * *